Nov. 19, 1940.                     C. H. KING                    2,222,412
                                    BATTERY
                            Filed Nov. 22, 1937
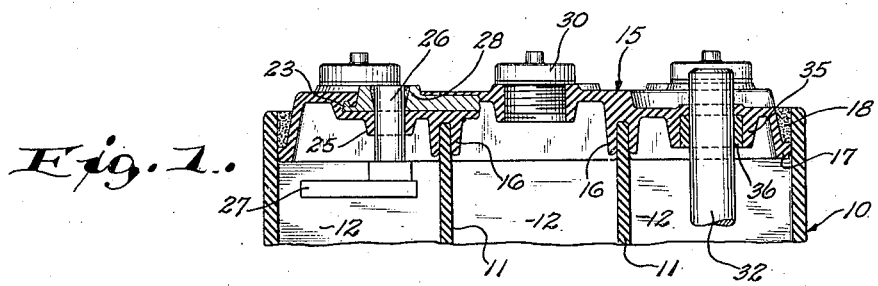
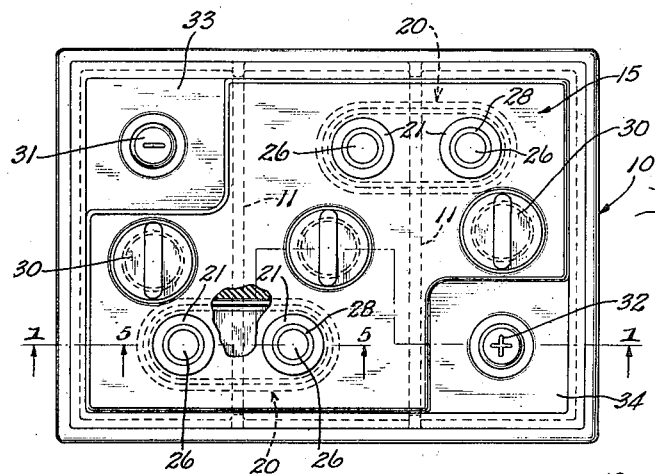
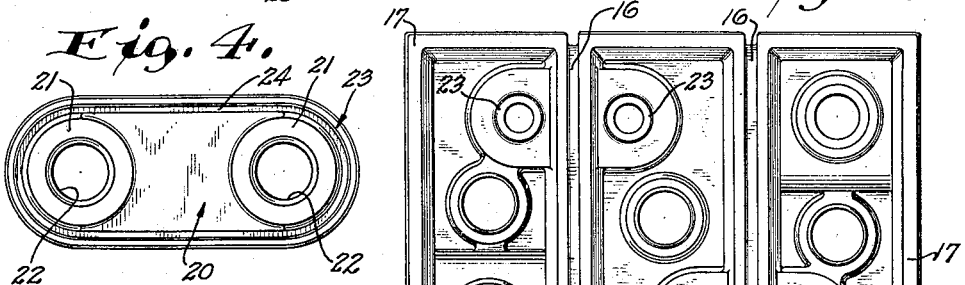
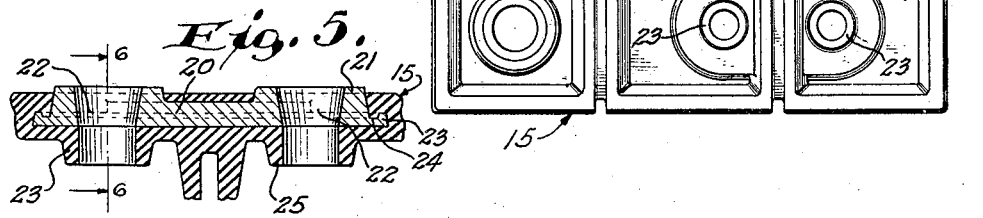
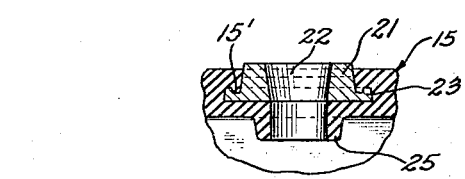
INVENTOR.
CARL H. KING.
BY John W. Michael
ATTORNEY.

Patented Nov. 19, 1940

2,222,412

UNITED STATES PATENT OFFICE 2,222,412

BATTERY

Carl H. King, Milwaukee, Wis., assignor to Globe-Union Inc., Milwaukee, Wis., a corporation of Delaware Application November 22, 1937, Serial No. 175,870

2 Claims. (Cl. 136—134)

This invention relates in general to storage batteries and more particularly to an improved cover and cell connector structure therefor.

One of the objects of the invention is to provide a battery of this character wherein the cell connectors are embedded in the cover in such a special and effective way as to prevent leakage of the electrolyte therearound.

Another object of the invention is to provide a structure of this character which provides an effective mechanical connection and a seal between the cell connectors and the posts extending therefrom to the straps which are in turn connected with the plates in each cell of the battery.

Another object of the invention is to provide a battery having these advantages and features and which is simple and durable in construction, reliable and effective in operation and easy and comparatively inexpensive to manufacture.

The structure provides a battery wherein the cell connectors are enclosed and protected and yet their apertured ends may be readily burned to the posts extending therefrom to the straps of the plates of the battery. Leakage of the electrolyte past the posts or around the cell connectors is effectively precluded.

Another object of the invention is to provide a battery of the character referred to and having the advantages mentioned and which also makes provision for the accommodation of the terminals and the connectors employed between the terminals and the leads from the battery without increasing the overall dimensions of the battery.

Other objects and advantages reside in certain novel features of the construction, arrangement and combination of parts which will be hereinafter more fully described and particularly pointed out in the appended claims, reference being had to the accompanying drawing forming a part of this specification and in which:

Figure 1 is a fragmentary view in transverse vertical section taken on line 1—1 of Figure 2 and showing a battery constructed in accordance with the present invention, parts being shown in elevation for the sake of illustration;

Figure 2 is a view in top plan of the battery shown in Figure 1;

Figure 3 is a view in bottom plan of the cover of the battery;

Figure 4 is a detail view in top plan of one of the cell connectors;

Figure 5 is a fragmentary sectional view taken on line 5—5 of Figure 2; and

Figure 6 is a fragmentary view in transverse vertical section taken on line 6—6 of Figure 5.

Referring to the drawing, the numeral 10 designates generally the case of the battery which may be of any suitable construction and which is shown as being provided with internal partitions 11 which divide the interior of the case up into cell forming compartments 12. The compartments 12 are designed to receive the plates and the electrolyte (not shown) which constitute the usual elements of the battery.

A one piece, pre-molded cover 15 is provided and is preferably molded from hard rubber or other suitable composition in the form of an inverted pan or tray and is also formed on its underside with transverse channels 16 which fit over the upper edges of the partitions 11. Around its lower marginal edge the cover is provided with integral outwardly directed horizontal flanges 17 which may be made as continuations of the structure which provides the channels 16. (See Figure 3.) When the cover is set in position in the case of the battery its outer peripheral portions and the flanges 17 provide a trough-like space for the reception of sealing compound 18.

When the cover 15 is being molded, cell connectors designated generally at 20 are embedded therein. Each cell connector consists of a strap-like piece of lead or other suitable metal provided adjacent its ends with upwardly extending integral ring-like enlargements 21. The ring-like enlargements 21 and the underlying portions of the cell connectors on which they are formed are provided with vertically disposed openings 22 extending through the top and bottom of the portions of the cell connectors in which they are formed. The cover and cell connectors are so dimensioned and proportioned and are so relatively disposed that in the assembly the cell connectors are completely housed and protected except for the top surfaces of their ring-like enlargements, which surfaces are exposed through the top of the battery cover.

The present invention proposes so to constitute the cell connectors 20 that they are positively interlocked with the material of the cover and this in such a secure and positive manner that leakage around the cell connectors is precluded even though the battery is subjected to extreme vibration. One way of accomplishing this object is to provide each cell connector with a flange 23 extending entirely around its margin and co-acting with the adjacent portion of the cell connector to form a groove 24. When the cell connector is embedded in the battery cover a portion 15' of the material of the cover fills the groove 24 and effects the positive interlocking desired.

Below each opening 22 the battery cover 15 is provided with an integral downwardly extending tubular formation 25, as clearly shown in Figures 1, 5 and 6.

When the cover 15 is assembled with the battery the openings 22 accommodate the upper end portions of posts 26. The lower ends of these posts 26 are suitably secured to straps 27 which may be in any suitable or conventional way to the plates (not shown) in its cell of the battery. The upper end portions of each post 26 are burned to the ring-like enlargements 22 of its cell connector as indicated at 28 in Figure 1. The tubular formations 25 are so dimensioned and designed that they tightly and snugly fit around the portions of the posts 26 which they receive and aid in precluding leakage past the posts.

The cover 15 is provided with a suitable number of removable filling caps designated at 30 and is also adapted to coact with the terminals 31 and 32 of the battery.

The corners of the cover 15 are formed with depressions 33 and 34 surrounding the terminals 31 and 32 and providing the space to accommodate these terminals and connectors between them and the leads from the battery (not shown) without increasing the overall dimensions of the battery. The openings through which the terminals 31 and 32 project are provided with annular flanges 35 integral with and extending downwardly from the underside of the cover 15 and designed to receive packing sleeves 36 of rubber or other suitable material (see Figure 1).

A battery constructed in accordance with the foregoing is one of improved appearance. The cell connectors being practically completely protected will not become corroded and do not present undesirable projections. They are so combined with the cover as to prevent leakage therearound and together with the tubular formations 25 prevent leakage past the battery posts. The construction is simple, comparatively inexpensive, and may be readily produced. Furthermore, the cell connections are so constituted and combined with the cover that they may be readily burned to the posts with which they are associated.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. A storage battery including a case having a plurality of cell compartments, a pre-molded cover for the case, and cell connectors embedded in the cover, each cell connector having a flange of angular cross section extending entirely around its margin, said flange constituting the entire outer edge formation of the cell connector and defining a continuous uninterrupted marginal groove adjacent the edge of the cell connector, the material of the cover filling the grooves of the cell connectors and being positively interlocked therewith.

2. A storage battery including a case having a plurality of cell compartments, a pre-molded cover for the case, and elongated cell connectors embedded in the cover, each cell connector having apertured end portions adapted to be received and be secured to battery posts, each cell connector having a marginal flange provided with an upstanding peripheral edge defining within the connector a groove extending entirely around its margin and adjacent to and paralleling its marginal edge, and receiving and positively interlocked with the material of the cover to prevent leakage around the margin of the cell connector.

CARL H. KING.